United States Patent [19]
Schott, Jr.

[11] 3,799,510

[45]*Mar. 26, 1974

[54] EXTRUSION OF PLASTIC AND THE LIKE

[75] Inventor: Charles M. Schott, Jr., Gloucester, Mass.

[73] Assignee: Gloucester Engineering Co., Inc., Gloucester, Mass.

[ * ] Notice: The portion of the term of this patent subsequent to Feb. 27, 1989, has been disclaimed.

[22] Filed: Jan. 18, 1971

[21] Appl. No.: 107,083

Related U.S. Application Data

[63] Continuation-in-part of Ser. No. 806,861, March 13, 1969, Pat. No. 3,605,654.

[52] U.S. Cl............................... 259/191, 425/202
[51] Int. Cl............................................. B01f 7/24
[58] Field of Search ............ 259/97, 191, 192, 193, 259/9, 10, 25, 26, 45, 46, 109, 110; 100/144; 425/200, 202, 209

[56] References Cited
UNITED STATES PATENTS

| 2,370,469 | 2/1945 | Johnson | 425/378 |
| 3,354,504 | 11/1967 | Lehner | 259/191 |
| 3,278,986 | 10/1966 | Welt | 425/378 |
| 1,790,347 | 1/1931 | Hawkins | 259/193 |
| 2,567,523 | 9/1951 | Moore | 259/193 |
| 3,261,056 | 7/1966 | Fritsch | 259/192 |
| 3,310,836 | 3/1967 | Nichols | 259/191 |
| 3,633,494 | 1/1972 | Schippers | 100/145 |

FOREIGN PATENTS OR APPLICATIONS

989,330   4/1965   Great Britain

Primary Examiner—Robert W. Jenkins

[57] ABSTRACT

Extruder, especially a vertically arranged extruder, and a system useful for recovery of scrap plastic film. An extruder feeder section comprising an initial portion of the extruder barrel has rotation retarding formation, preferably axially extending grooves, and forced feed fluid cooling. A vented section between first and second conveying sections of the extruder barrel has a relieved area including a guiding surface to cause plastic to gradually reconverge to the confines of the main barrel surface. A screw shank extending beyond the extruder outlet has a multi-piece seal which is anchored from rotation with the shaft.

35 Claims, 10 Drawing Figures

EXTRUSION OF PLASTIC AND THE LIKE

This is a continuation-in-part of my copending application Ser. No. 806,861 filed Mar. 13, 1969, now Pat. No. 3,605,654.

This invention relates to the extrusion of plastic and the like. Aspects of this invention relate more particularly to extruders useful in the high volume recovery of scrap plastic.

In the plastic film and sheet industry, a substantial percentage of the plastic material consumed becomes scrap or waste for a number of reasons, for example, because of trimmings or non-uniformity of the film. Economical operation of plastic production requires that the scrap be reclaimed, but various difficulties have been encountered, for instance the fluffy and flaky nature of ground scrap plastic film make it difficult to feed into an extruder, requiring complicated and expensive machinery such as hopper stuffers. In addition, some materials, e.g. compounded powders, are difficult to extrude with conventional machines.

It is an object of the invention to provide for reclamation of this scrap material and for extrusion of other materials with high volume apparatus that is simple, inexpensive, reliable, efficient and compact.

Another object of the invention is to provide a scrap extruder which avoids the necessity of a separately driven compressive feeder apparatus or hopper stuffer, but rather is self-feeding even with materials that are difficult to feed such as flakes of film or "fluff."

Still another object is to provide improved extruders of the type driven at the output end.

A further object is to provide extruders capable of producing plastic having uniform gas content.

According to one aspect of the invention it is realized that with difficult-to-feed particles such as flakes of film the feeding problem is complex and involves not merely the tendency of the flakes to bridge and not flow smoothly from the hopper, but also the tendency to conglomerate and turn with the first part of the screw, thus failing to move axially.

It is realized according to this aspect of the invention that the relatively small amount of heating that is involved in the initial region of the operating extruder screw due to friction or conduction from other parts of the extruder has an extremely detrimental effect, and that means for cooling the initial screw portion, even if removing only a small amount of heat, makes the difference between success and failure in the feeding of various materials.

It is also realized that rotation retarding formations on the inner surface of the initial extruder barrel, particularly if made extremely non-porous and if cooled, are effective to counter detrimental rotation of the inlet mass. Combination of this rotation retarding with initial cooling of the screw leads to successful feeding of materials that have a wide range of physical characteristics, as result from varying size of the particles, and varying height of the material in the hopper, and varying electrostatic charge between particles.

According to another feature of the invention, the drive of the screw is from the output end and an air chamber is provided in the screw itself, outward of the outlet passage. This chamber achieves thermal isolation of the outlet part of the screw which must be kept hot, and the drive shank of the screw, which is advantageously kept cool for proper operation of the reduction gears. With this air chamber there is advantageously combined a liquid cooling device for the outer end of the screw shank. This cooling contributes to the formation of an effective seal against escape of the molten plastic, without detrimental effect upon the high temperature level of the output passage. According to one aspect of the invention a seal omitting cooling, and thus of simple construction, is effective about the cooled shank to prevent leak out of certain plastics such as molten polystyrene.

The invention also features an outer seal member comprising a plurality of circumferentially releasably joined portions and forming the restricted sealing passage about the shank. This structure permits the seal assembly to be inexpensive and yet permits maintenance or substitution of a new seal member without removal of the screw, while successfully resisting the tendency of molten plastic to escape outwardly along the shank. The split seal member preferably is radially free-floating on the shank, in combination with anchoring means (preferably moment arm means without detrimental side loads) preventing rotation of the seal with the shank.

In a further aspect of the invention there is featured a vented extruder for extruding materials containing gaseous components to be removed. The extruder includes a heated extruder barrel having a main internal surface of revolution closely surrounding a driven extruder screw for mixing, working and conveying the material along the barrel. The extruder has a first conveying portion, a second conveying portion, and a vent communicating with the barrel's exterior at a position between the first and second conveying portions. A relieved area is provided in the main barrel surface with the vent communicating directly with the space defined by the relieved area, thereby providing a vented space to which the plastic is exposed. The relieved area preferably has a circumferential width less than one half the circumference of said main barrel surface. The screw has a flight portion in the region of the relieved area so that material reaching that area can be carried with rotation of the screw flight to recontact the main barrel surface thereby enabling resumption of normal conveying of the material. The relieved area includes a guide surface, preferably gradually converging to the main barrel surface, which is operable beyond the vent in the direction of travel of the screw flight to gradually guide or converge the plastic back into the confines of the main barrel surface.

In preferred embodiments of this aspect of the invention the guiding surface gradually converges by being a second surface of revolution formed in the material of the barrel and having a radius of curvature less than that of the main barrel surface. A surface gradually diverging from the main barrel surface to the vented space is preferably provided at a position in advance of the vent (relative to the direction of travel of the screw flight). The gradually converging and diverging surfaces may have the same curvature formed from the same center, but the diverging surface may be much smaller than the converging surface. The vented space may include an elongated slot through the barrel wall and at least one other opening which extends from an intermediate portion of the slot to the exterior of the barrel where that opening is adapted to communicate with a source of vacuum. A cover device (preferably transparent) may seal the slot; when the source of vacuum is connected, the cover device may be retained in position by the pressure differential.

Other objects, features, and advantages will appear from the following description of a preferred embodiment of the invention, taken together with the attached drawings thereof, in which.

Figure 1:
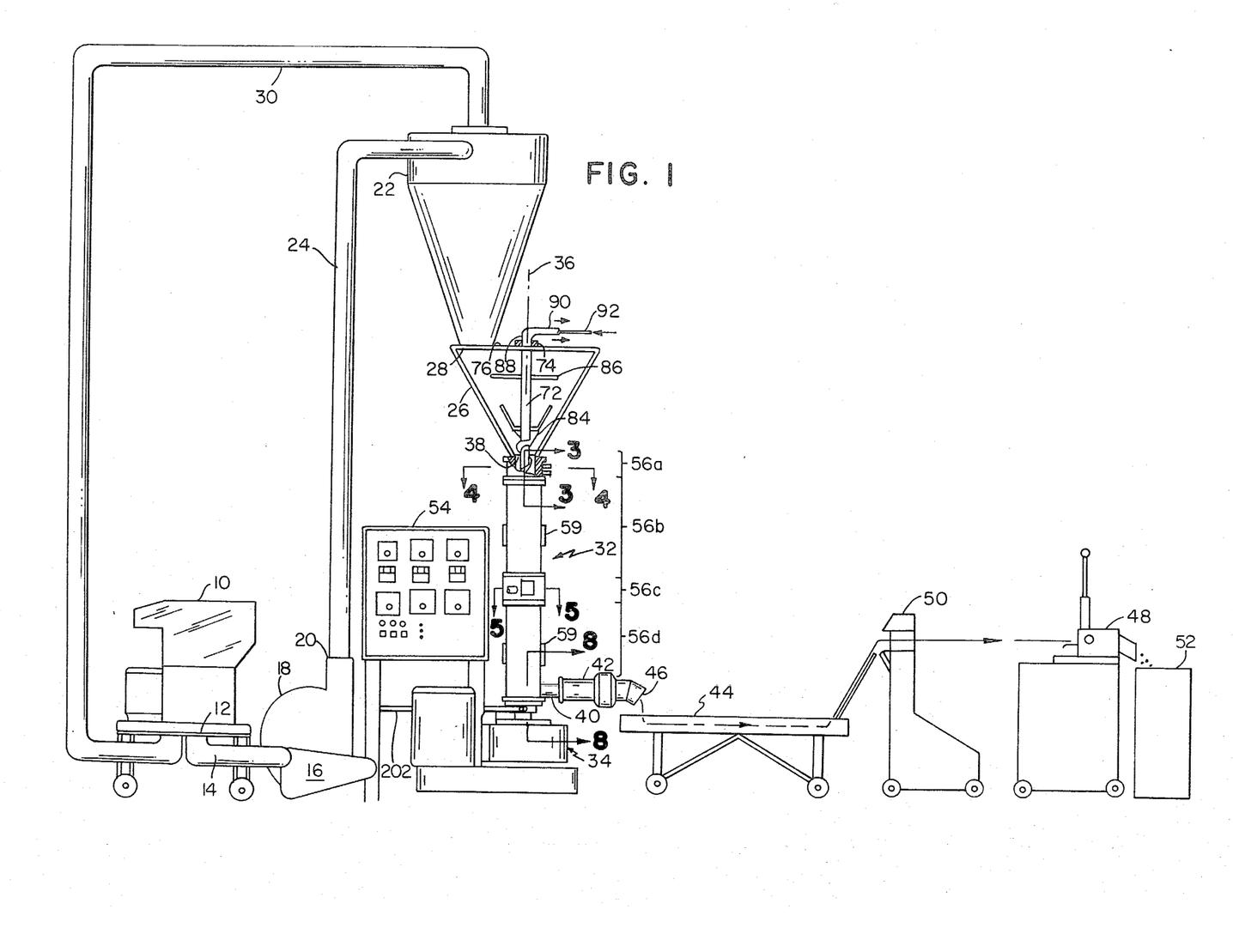
FIG. 1 is an overall view, partially broken away, of apparatus for reclaiming scrap plastic.

Referring to FIG. 1, grinder 10 is arranged to receive large sheets of plastic films and to cut them into flakes, called "fluff." These flakes may range in size for instance from a diameter one-fourth inch to three-fourths inch and have the thickness of the original film or sheet, e.g. 0.0005 inch to 0.010 inch. Such flakes may be produced with conventional grinders using screens with hole sizes ranging from one-half inch to 1 ½ inches diameter. The output 12 of grinder 10 is connected by pipe 14 to the input 16 of blower 18, the output 20 of which is connected to cyclone 22 by pipe 24.

Blower 18 receives fluff from grinder 10 and blows the fluff up pipe 24. Cyclone 22 which receives the fluff is mounted upon conical hopper 26 and has an opening 28 forming an inlet into hopper 26. It also has air return pipe 30 arranged to return air to grinder 12 and blower 18.

Vertical extruder 32 is mounted (on base 34) directly below hopper 26 with longitudinal axis 36 concentric with hopper 26, has inlet 38 from hopper 26 and output 40 to die 42; and due to this arrangement and the features to be described, it receives fluff from hopper 26, forces the fluff downwardly under pressure and melts it, and issues molten plastic through output 40 to die 42. Trough 44 is arranged to receive molten plastic strands from orifice 46 in die 42 and to cool the plastic strands with water. Pelletizer 48 pulls the cooled plastic from trough 44, through drier 50, to grind the plastic into pellets, and to deposit the pellets in container 52. Control panel 54 controls heating and cooling temperatures. The pellets from this process may now be treated as fresh stock useful with other extruders. Equally, the output of the extruder may be employed directly in forming articles, sheet or film.

A plurality of surrounding heater bands 59 are spaced along the extruder to maintain the usual high temperature necessary for melting the plastic, e.g., 350° to 375°F.

The screw 60 with a machined helical flight 66 (see FIG. 3) is rotatably mounted concentric with axis 36 on bearings (not shown) in base 34. An initial portion of the screw, 60a, having a hollow root defining chamber 62, extends through the initial barrel portion 56a and extends upwardly through inlet 38 into hopper 26. The effective outer diameter of the screw 60 is slightly smaller than the inner diameter 70 of barrel 56.

Hollow pipe 72 forms an upper extension of the screw and is rotatably mounted by bearing 74 on top 76 of hopper 26. It has inner diameter 78 slightly larger than the outer diameter 80 of the upper end 82 of the screw 60 over which it fits.

Pipe 72 carries helical agitator 84 (FIG. 1) and upper agitator bar 86, and is arranged to be rotated by screw 60. Pipe 72 and internal pipe 73 (FIG. 3) extend upwardly to rotary seal 88 with stationary pipes 90 and 92 which are connected to a water storage and cooling tank (not shown). The cylindrical hollow chamber 62 (FIG. 3) extends throughout the length of initial barrel portion 56a. Hollow chamber 62 has cylindrical wall 94 of diameter 96.

Figure 3:
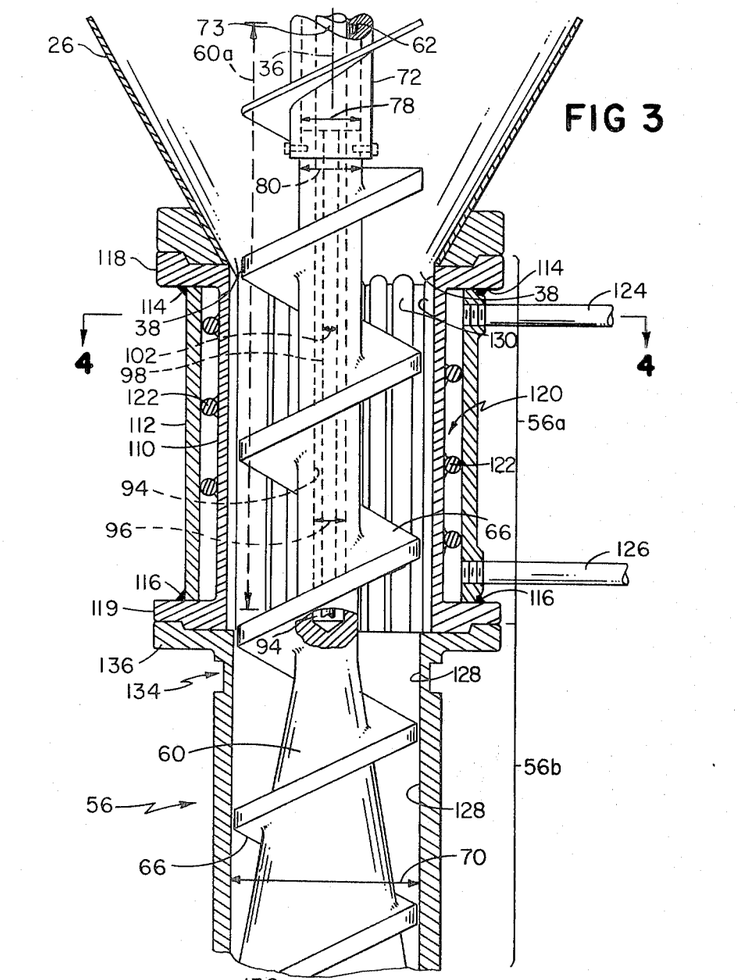
FIG. 3 is a side view (with the extruder barrel in cross-section taken along line 3—3 of FIG. 1), showing the initial portions of the barrel and screw.

Pipe 98 disposed within and concentric with hollow portion 62, has smaller outer diameter 102 than inner diameter 96. Thus inner pipes 98, 73 and 92 form in their insides an internal passage for flow of cooling liquid in one direction through the initial or feed portion of the screw (corresponding to the initial or feeder barrel portion), while a passage for flow in the opposite direction is provided on the outsides of these pipes. Cooling liquid in these passages cools by conduction screw 60 and its flight 66 in feeding portion without cooling lower portions of the screw.

From the feeder section downward to outlet 40 is the working length of the screw. In this embodiment the heater bands 59 spaced along this length are adapted to maintain temperatures of 350°F and above, for instance for extrusion of polyethylene.

In addition to the initial portion 56a, the barrel has a first conveying portion 56b, a vent portion 56c, and a second conveying portion 56d, all described in further detail below.

Figure 1A:
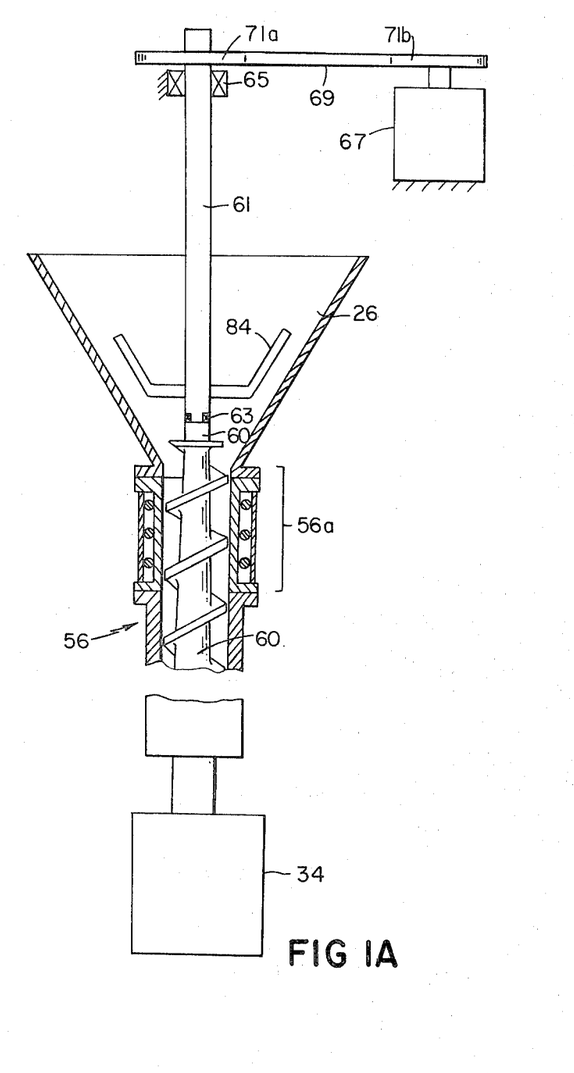
FIG. 1A is a partially broken away view of an extruder and hopper showing separate drive means for the extruder screw and a hopper agitator.

An alternative extruder arrangement, shown in FIG. 1A, provides separately driving the extruder screw 60 and the hopper agitator. This feature allows the rotation of the hopper agitator at a slower speed than the extruder screw, the agitator in certain instances being most effective at rotation rates much lower than an efficient rate of rotation of the screw.

In this alternative arrangement, the screw 60 is again driven from the output end of the extruder by drive means (not shown) within the base 34. The agitator, however, is mounted upon a separate shaft 61 mounted for rotation with respect to the screw 60 and axially aligned therewith. A conventional bearing mechanism 63 may be employed for this purpose, carried in the upper end of screw 60, screw 60 thus serving as part of the rotatable mounting of the agitator shaft. The shaft 61 extends vertically above the hopper 26 and is supported in bearing 65. The shaft is driven at any desired rotation rate by motor 67 through belt 69 trained about sheaves 71a and 71b. The agitator assembly is not closely surrounded by the hopper and therefore does not perform a forward forcing function, therefore allowing light weight and inexpensive construction, while satisfying the needs of the preferred embodiment by preventing bridging of scrap in the hopper.

Referring again to FIG. 3, the initial portion of the barrel 56a has an inner wall 110 and a concentric outer sleeve 112 radially spaced from the inner wall and welded, as at 114, 116, to flanges 118, 119 extending outward from the upper and lower ends of the inner wall. The annular space 120 between inner wall 110 and sleeve 112 provides a helical cooling region when rod 122 is welded to the outer surface of wall 110 in a helical configuration. Cooling liquid under pressure is supplied to that cooling region by either of pipes 124, 126 and is removed therefrom by the other. Force fed fluid cooling of the initial barrel portion 56a, has been found to be a critical factor in a successful, high volume extruder.

Figure 4:
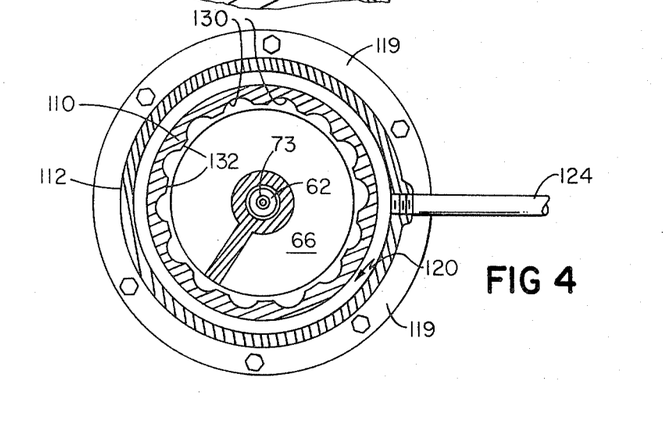
FIG. 4 is a transverse sectional view taken along line 4—4 of FIG. 3.

The main internal barrel surface 128 (cylindrical, in the embodiment illustrated) is provided with formations 130 in the initial barrel portion 56a which serve to retard rotation of plastic with respect to the barrel. These formations take the form of grooves 130 having their longitudinal axis aligned with the axis of the barrel 56. As best seen in FIG. 4, each groove 130 has the shape of a longitudinal section of a cylinder which has a radius substantially less than the radius of the barrel itself, the curvature centered slightly inwardly from the projected main barrel surface so that the groove represents approximately one third of the full cylinder. Each groove is circumferentially spaced from its neighboring grooves by a cylindrical land surface 132 centered on the axis of the barrel. The provision of these land surfaces 132 resists erosion of the grooves themselves on the occasion that the screw flight 66 rubs against the initial barrel portion. It is presently preferred that the grooves have a radius of about five-sixteenths inch, with about one-third of the circle being within the groove on an extruder having a cylindrical main internal barrel surface 70 (see FIG. 3) of about 4 and ½ inches.

The fact that grooves 130 are of circular cross section aids in their finishing to a highly polished, non-porous surface, since cylindrical rotary grinding and polishing drums may be employed. In their preferred form, the grooves are first preliminarily shaped and then smoothed with abrasive drums to a surface smoothness of 16 rms. A chrome finish is then applied and final polishing takes place. A surface smoothness which is no greater than 20 rms. is believed necessary to prevent a build up of plastic in the grooves than would be detrimental to high volume production.

A thermal barrier is provided to thermally isolate the cooled initial barrel portion 56a from the heated portions of the barrel. As seen in FIG. 3, the thermal barrier may take the form of a region of reduced thickness 134 of the wall of barrel portion 56b just below the flange 136 (which mates with flange 119 for the joining of barrel portions 56a and 56b). Since the flow of heat along the barrel is affected by the cross-sectional area of the barrel wall, the region 134 limits the upward flow of heat to portion 56a.

In operation of the machine as thus far described, the controls on panel 54 are set to the desired temperatures, grinder 10, blower 18, extruder 32, drier 50, pelletizer 48, and the water pump are turned on. Material to be extruded (for example, scrap plastic film to be reclaimed) is placed in grinder 10 where it is ground into fluff. The fluff descends from grinder output 12 into blower 18 through pipe 14 and input 16 and is blown through pipe 24 into cyclone 22. Air is recirculated from cyclone 22 through pipe 30 into grinder 10 and blower 18. The fluff is whirled about in cyclone 22 and descends under the force of gravity through opening 28 into hopper 26, whereupon it is agitated by agitators 84 and 86 as it descends within hopper 26.

The fluff flakes compact easily due to their parallel alignment and the effect of gravity. Screw threads 66 draw the fluff which has been agitated into feeder barrel portion 56a. Gravity helps to insure the total immersion of threads 66 by the fluff and the vertical construction ensures an even flow of the fluff. Experiments with the combination of the rotation retarding grooves 130 cut in the inner surface of feeder barrel portion 56a, the cooling effect of the water pumped through the feeder portion of the screw, and water pumped through barrel cooling passages 20 in a vertical extruder as shown, proves that the fluff is prevented from conglomerating, blocking and turning with the screw over a wide range of conditions and high rate production is attainable. For optimum results, grooves 130 should be wide at their inner periphery to permit the fluff to descend through portion 56a under the pressure exerted by threads 66. For best results known to date the surface area of grooves 130 should be arranged substantially around the entire inner surface area of portion 56a (preferably more than about ten grooves) to increase the quantity of fluff passing through portion 56a, and the effective diameter 64 of threads 66 should be substantially the same as effective inner diameter 70 of portion 56a to increase the positive driving effect of threads 66 pushing the fluff downward.

The action of the grooves is complex. The wall or inward most portions prevent rotation of the plastic mass while the high finish (smooth) surface avoids resistance to travel of the plastic lengthwise of the barrel as it is wedged forward by the screw. Also cooling of these grooves (and the thermal isolation 134) opposes the melting of the plastic and sticking to the grooves—which both would resist travel of the plastic along the grooves and would create a tendency for the grooves to be permanently filled by stationary material and lose their retarding effect. Furthermore this cooling helps to keep the plastic in the hopper free flowing.

The cooling of the uppermost portions of the screw also prevents heating of the fluff caused by the relative movement between threads 66 and the fluff and prevents heat from being conducted from lower portions of the extruder. As the fluff is forced further into barrel 56, it passes from feeder barrel portion 56a into conveying portions where it is heated. The fluff melts as it is gradually forced down and it passes through a metering stage and output 40 into die 42 whereupon it issues, for example, in the form of strands or a sheet from opening 46 into cooling trough 44. It is drawn by pelletizer 48 through drier 50, enters pelletizer 48, is formed into pellets, and the pellets are deposited in container 52. The pellets thus produced or reclaimed are amenable to extrusion by ordinary processes, e.g., with a standard horizontal extruder.

Figure 2:
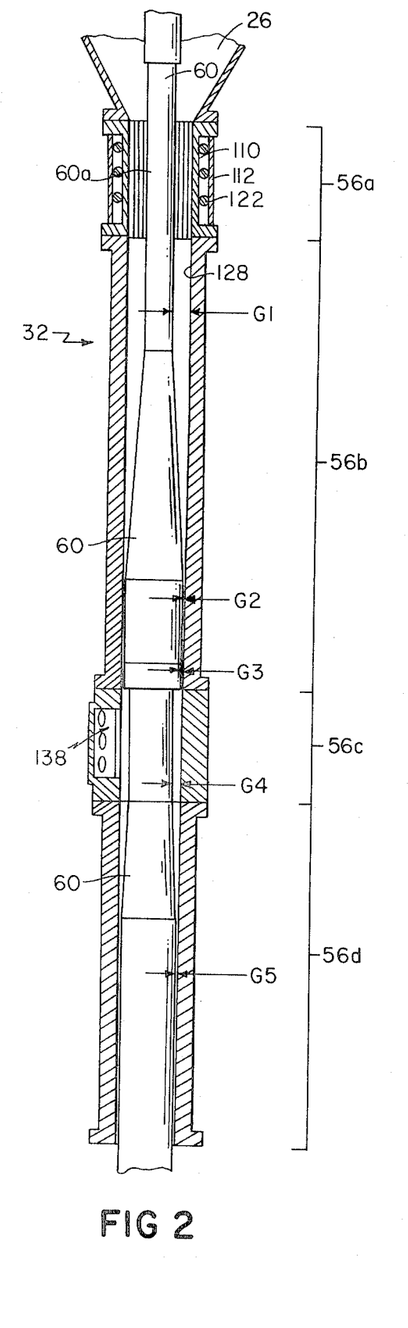
FIG. 2 is a broken away view of an extruder showing the various regions of the extruder barrel and screw (the screw flights having been omitted)

FIG. 2 illustrates the configuration of the extruder barrel 56 and the relationship of the screw design to the barrel portions 56a–56d as employed in the preferred embodiment in which gaseous constituents are to be removed by extruder 32. In a presently preferred form the main internal surface 128 of the barrel is in the form of a cylinder having a diameter of 4½ inches. The screw root 60 (flight 66 having been omitted from this figure) has its axis aligned with the axis of the barrel. The diameter of the screw root varies over the length. But for the exception noted below, however, the outermost surface of the flight is maintained at the same distance (approximately 0.005 to 0.010 inch) from the barrel surface 128 over the entire length of the screw. The screw flight extends substantially continuously throughout the length of the screw and in this preferred form has a constant pitch flight equal to the diameter of the screw.

At its uppermost portion, the screw root has a diameter of about 1¾ inch. This diameter is constant throughout the initial screw portion 60a, which has an axial length of about two barrel diameters, and also for a distance of one barrel diameter above initial portion 60a and for a distance of two barrel diameters into the barrel portion 56b. At that location within barrel portion 56b, the root diameter begins to increase and, over a distance of four barrel diameters, reaches a diameter of about 4 inches thereby providing a gap G2 between the root 60 and the surface 128 of about one-quarter inch. This gap is maintained for a distance of about two and one half barrel diameters; whereupon the flight is interrupted for a distance of one half a barrel diameter and the root-surface 128 gap, G3, becomes about 0.030 inch. The extruder region corresponding to this gap G3 may be called a "restriction." The effect of the restriction is discussed further below.

At a location aligned with the interface of barrel portions 56b and 56c the root diameter sharply decreases to about 3 inches, thereby providing a gap G4 between the root and the main barrel surface of barrel portion 56c of about three-quarters inch. At a location aligned with the interface of barrel portions 56c and 56d the root diameter begins to gradually increase once again and, over a distance of about two barrel diameters, reaches a diameter of about 4 inches to provide a gap G5 of about one-quarter inch. The gap G5 is maintained from that location to the lower end of barrel portion 56d, a distance of about four barrel diameters.

With the foregoing description in mind, the general arrangement of the extruder 32 may be further specified. The extruder portion corresponding to barrel portion 56a, and to the hopper and screw portions immediately thereabove, may be termed a feeder portion. The portions corresponding to barrel portions 56b and 56d may be called first and second conveying portions, respectively. The barrel portion 56c is provided with a vent, indicated generally at 138, comprising various openings as described below.

As the initially cold plastic is heated, worked and conveyed in the first conveying portion, the flakes or fluff of plastic become increasingly soft and tacky. For the extruder portion dimensions and heating schedule discussed above, the plastic has not really liquified and the individual flakes still retain some integrity by the time the plastic reaches the vent portion of the extruder. The restriction in the lower end of barrel portion 56b immediately above the vent portion 56c serves to produce a pressure build-up in the preceding metering zone to allow the required working of the plastic. The following vent portion, of expanded volume, is effective to permit a significant reduction of pressure and extraction of unwanted gases from the plastic mass without removal of the plastic itself from the barrel. The expanded volume of the vent region is due, in the embodiment illustrated, to the decrease in screw root 60 diameter in the vent region. This volume is also effective to accommodate transient variations in actual rate of movement of the plastic without blocking vent passages.

Blockage of vent portion 56c is further avoided by having a conveying rate characteristic of the second conveyor portion of the extruder which is at least as great as that of the first conveyor portion.

Figure 5:
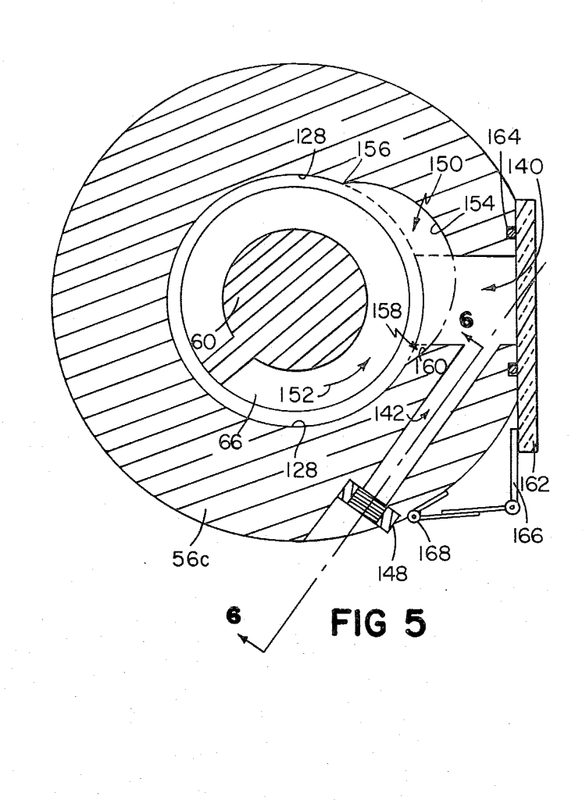
FIG. 5 is a view taken at 5—5 of FIG. 1 showing the extruder vent.
Figure 6:
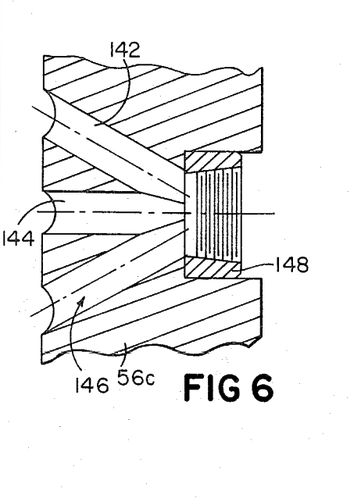
FIG. 6 is a sectional view taken at 6—6 of FIG. 5 showing detail of the openings in the extruder barrel shown in FIG. 5.
Figure 7:
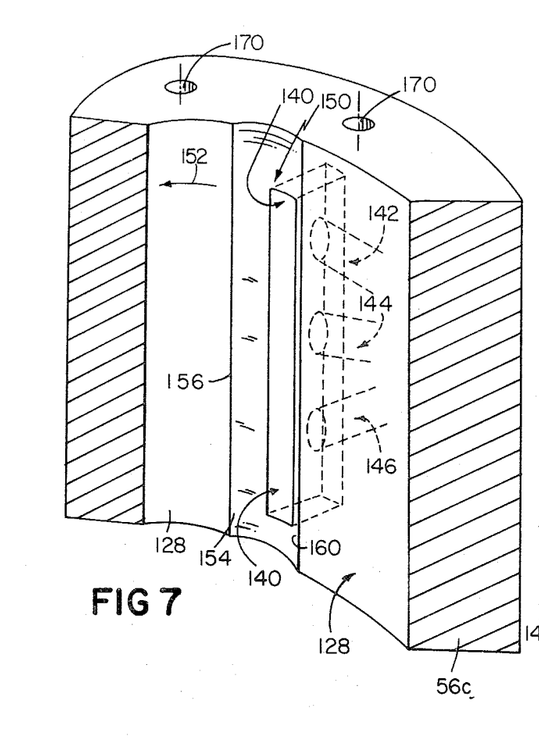
FIG. 7 is a perspective view of the main internal surface of revolution of the extruder barrel in the region of the vent.

Referring to FIGS. 5, 6, and 7, a relieved area is provided which corresponds to the axial length of a slot 140 and a surface 134 which is circumferentially beyond the slot 140 in the direction of travel of the screw flight 66 (see arrow 152). A vent communicates directly with the space defined by the relieved area, thereby providing a vented space (comprising at least portions of slot 140 and space 150) to which the plastic is exposed. Beyond the slot, surface 154 gradually converges to the main barrel surface 128 at 156. In its preferred form the surface 154 is a portion of a longitudinal section of a cylinder having a radius of curvature less than that of the main barrel surface 128, the relieved area having a circumferential width less than one-half the circumference of surface 128.

The relieved area may also encompass space at a position in advance of the slot 140 (relative to direction 152). Space 158 is defined by surface 160 which gradually diverges from main barrel surface 128. Surface 160 may have the same curvature as surface 154 and be formed from the same center (as is the case in the illustrated embodiment), thus permitting machining of both surfaces in one simple operation.

The vent structure is also shown in FIGS. 5, 6, and 7. The elongated slot 140 extends radially through the barrel wall of barrel portion 56c from the interior to the exterior of the barrel. For an extruder having an interior barrel diameter of about 4 and ½ inches, the slot may advantageously be about 1.5 inch in circumferential dimension and about 7.0 inches in axial dimension, greater than the pitch length of the screw. Passages 142, 144, and 146 are provided which extend from an intermediate portion of slot 140 (in most instances at least one fourth inch from the main barrel surface as projected), to the exterior of the barrel where they are adapted to communicate with a source of vacuum (not shown). The adaptation may conveniently be the termination of the openings in a coupling member 148 suitable for receiving a threaded connector from a vacuum line. As best seen in FIG. 5, the axes of passages 142, 144, and 146 project through the exterior end of slot 140, whereby access to passages 142, 144, 146 is readily had for inspection and cleaning thereof, e.g., by a straight cleaning device inserted into the passages from exterior of slot 140.

A vented space and a slot opening of substantial size (as in the preferred embodiment just described) assure exposure of the plastic to the reduced pressure of the vent passages for sufficient time that unwanted released gases may easily exit through those passages under the influence of the pressure differential. The reduced pressure may be merely atmospheric pressure or may be a source of vacuum, e.g., about 28 inches of mercury) communicating with vent passages via coupling member 148.

A transparent cover device 162 is provided which cooperates with an O-ring 164, in a recess in the exterior barrel surface surrounding the exterior end of slot 140, to seal the slot 140. When a source of vacuum is employed to evacuate the gases from the vented space through passages 142, 144, and 146, the cover device is held in position against the O-ring by the pressure differential. Serially connected hinges 166 and 168 support the cover device 162 upon the barrel portion 56c and allow it to find its own seat. The transparent cover device provides means for visual inspection of the vented space without breaking the vacuum.

Threaded apertures 170 are provided in the upper and lower surfaces of the extra-thick barrel portion 56c which align with bolt holes in flanges affixed to the ends of portions 56b and 56d.

While the action of the plastic in the barrel portion 56c is not completely understood, the following discussion indicates some of the benefits obtained with the structure just described.

In conveying portions of the extruder the path taken by the plastic material has a predominant axial component with a slight circumferential superimposed thereupon (due to drag along with the screw flight) to produce a slightly helical course. This same type of path or course is followed within portion 56c except when the plastic is in the relieved area adjacent surfaces 154 and 160 and opening 140. When thus relieved, the drag forces of the barrel cease to be operative, and the screw ceases to have its usual axial wedging or forwarding effect. Rather, the somewhat porous but self-sticking plastic mass rolls and is carried with the screw. As viewed in FIG. 5, the circumferential component of the plastic's motion will be in the direction of rotary travel of the screw flight, i.e., counterclockwise. Initially, when plastic reaches the surface 160 it tends to bulge outward and at least partially fill the relieved area 158. This outward bulging is accompanied by the severe decrease in the axial component of the motion first mentioned. When the plastic is aligned with the opening 140 itself, the outward bulging is completed and axial motion is absent. The converging surface 154 assures that the plastic in the vented space will not, as circumferential travel continues, strike the side wall of the slot 140 and build up thereupon, but will be gradually redirected by surface 154 back to main barrel surface 128. Circumferential movement along surface 154 is accompanied by increasing axial components of the path, since the dragging effect of that surface is gradually increasing as it is traversed.

Thus, with the configuration described, plastic is exposed to the venting space for the removal of released gases during a period of limited axial motion and is returned to a normal conveying situation without detrimental build-up of plastic and clogging of the vent. The diverging surface 160 preceding the slot 140 has been found effective to prevent a build-up of plastic when it tends to occur at the otherwise sharp corner (where slot 140 and surface 128 would meet) during the sudden outward bulging.

Figure 8:
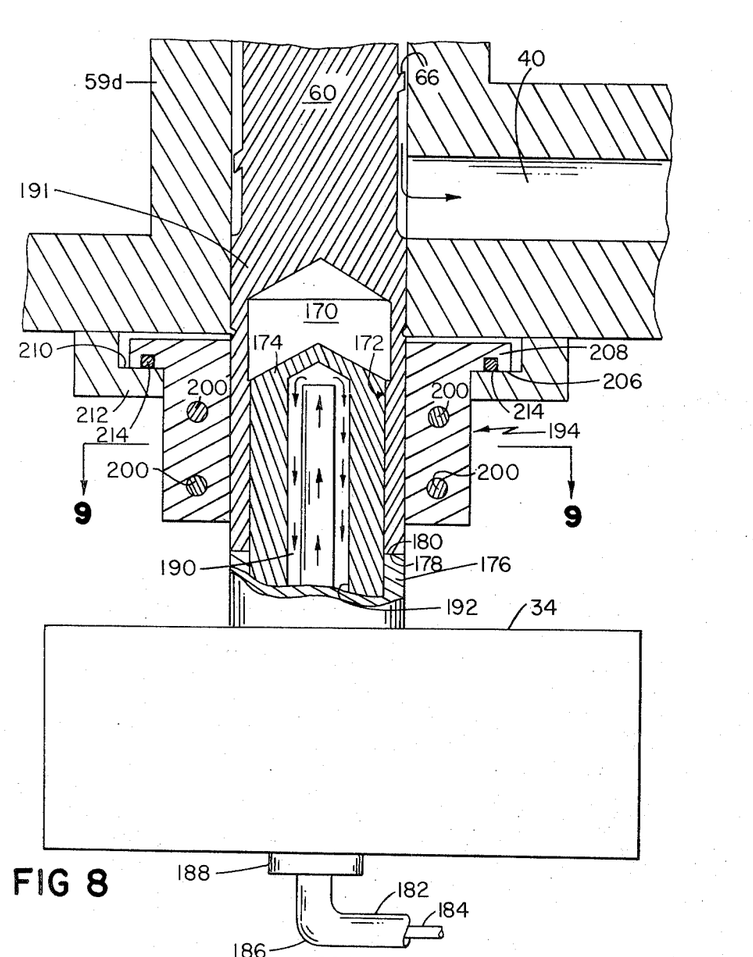
FIG. 8 is a sectional view taken along line 8—8 of FIG. 1 showing the screw shank and a seal near the drive end and output passage of the extruder.
Figure 9:
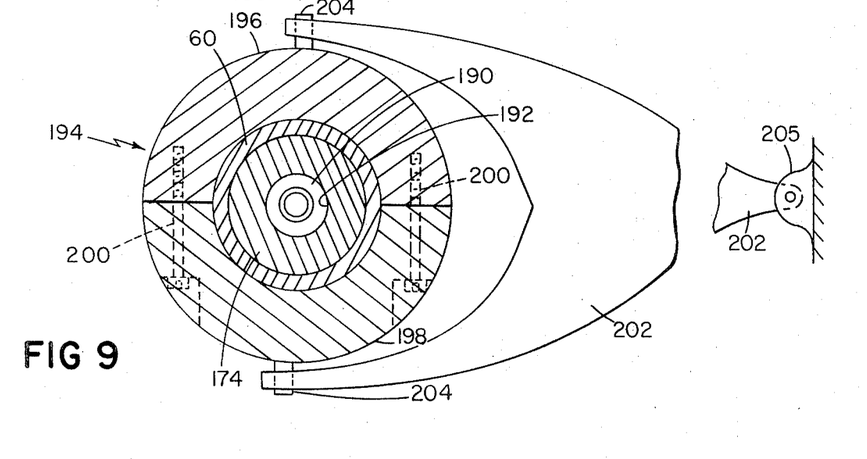
FIG. 9 is a view taken at 9—9 of FIG. 8 further illustrating said seal.

Referring to FIGS. 8 and 9, at the lower end of the extruder 32 the shank 191 of screw 60 extends beyond the plastic outlet 40 to drive means (not shown) within base 34. The shank has hollow air-containing insulating chamber 170 which is in turn above and adjacent a cylindrical hollow portion 172, the latter filled by a cooling member 174 which defines the lower end of the insulating chamber 170. The air-filled chamber 170 is slightly separated from output 40 by a solid portion of screw 60.

Hollow cylindrical shaft 176, a lower extension of the shank, is mounted in the base 34 by bearings (not shown), and has annular surface 178 arranged to mate with base 180 of the screw 60.

Outer pipe 182 and inner supply pipe 184 extend from a water pump (not shown) rotary seal 188, make flow connection with annular space 190 between pipe 184 and surface 192 to provide a return path to the water storage and cooling tank for water pumped through pipe 184 in accordance with arrows shown.

A seal 194, comprising portions 196, 198 (FIG. 9), is provided around the shank of the screw 60. The portions are attached by means of bolts 200 to define an inner seal surface which is approximately congruent to the exterior surface of the shank but is radially floating with respect thereto and therefore is free to maintain an operable clearance on all sides—through the centering action of the plastic—despite deflections of the shank from true fixed axis rotation. A torque arm 202 extending from trunnions 204 on the seal portions 196, 198 to a fixed anchoring location 205 about 2 feet away (preferably at least four diameters of the shank away) is provided to prevent the seal structure from rotating with the shank without applying detrimental side loads to the seal. The surface 206 of flange 208 maintains a seal with the surface 210 of flange 212 depending from the structure 56 by means of O-ring 214.

While the seal portions 196, 198 may each be provided with force fed fluid cooling systems, it has been found that an uncooled seal may be employed in this arrangement when extruding highly viscous materials such as polystyrene due to the efficiency of the insulating chamber 170.

While preferred embodiments have been described in detail, other embodiments of the invention will occur to those skilled in the art and are within the appended claims.

What is claimed is:

1. A vented extruder for extruding plastic and the like containing gaseous components to be removed comprising a heated extruder barrel having a main internal surface of revolution closely surrounding an extruder screw to enable mixing, working and conveying of plastic along said barrel, and a drive means for said screw, said extruder having a feed portion, a first conveying portion, a second conveying portion, and a vent communicating with the interior of said barrel at a position between said first and second conveying portions, there being a relieved area in said main barrel surface, said vent communicating directly with the space defined by said relieved area providing a vented space to which the plastic is exposed, the screw having a flight portion in the region of said relieved area whereby plastic reaching said relieved area can be carried with rotation of said flight portion across said area to recontact the main barrel surface to enable resumption of normal conveying of said plastic along the barrel length, circumferentially beyond said vent in the direction of travel of said screw flight said relieved area including a guiding surface to cause plastic to gradually converge to the confines of said main barrel surface.

2. The extruder of claim 1 wherein said guiding surface comprises a second surface of revolution formed in the material of said barrel, said second surface of revolution having a radius of curvature less than the radius of the corresponding portion of the main barrel surface.

3. The extruder of claim 2 wherein said vented space is elongated in the axial direction of said barrel and said guiding surface is cylindrical having an axis parallel to but spaced from the axis of the main barrel surface.

4. The extruder as claimed in claim 1 including at a position in advance of said vent, relative to the direction of travel of said flight, a surface gradually diverging from said main barrel surface to said vented space.

5. The extruder of claim 4 wherein said gradually diverging surface comprises a surface of revolution formed in the material of said barrel.

6. The extruder of claim 5 wherein both said guiding and diverging surfaces have the same curvature formed from the same center.

7. The extruder of claim 6 wherein said vented space includes an axially elongated slot formed through the thickness of said barrel.

8. The extruder as claimed in claim 1 wherein a first opening extends from said main barrel surface to the exterior of said barrel and a second opening extends from an intermediate portion of said first opening to said exterior of said barrel, the external end of said second opening adapted to communicate with a source of vacuum.

9. The extruder as claimed in claim 8 wherein said first opening provides a view port there being a transparent cover device whereby the end of said first portion of said vent at the exterior of said barrel may be sealed.

10. The extruder as claimed in claim 8 including a cover device for covering the exterior of said first opening, said cover device adapted to be retained in position by the pressure differential created when a source of vacuum communicates with said second opening.

11. The extruder as claimed in claim 10 wherein said cover device is mounted upon said barrel by two serially connected hinges.

12. The extruder as claimed in claim 8 wherein said first opening has a dimension parallel to the axis of said barrel which is greater than its dimension along a circumference of said barrel.

13. The extruder as claimed in claim 12 wherein said second opening is defined by a plurality of passages extending from axially spaced locations of said first opening.

14. The extruder as claimed in claim 12 wherein said first opening has the dimension of at least one inch in the direction of the circumference of said barrel.

15. The extruder of claim 12 wherein said dimension of said first opening in the direction parallel to the axis of the barrel is at least as long as the pitch of the said screw flight.

16. The extruder as claimed in claim 8 wherein the longitudinal axis of said second opening projects through the exterior end of said first opening, whereby said second opening is readily accessible from said end of said first opening for inspection and cleaning.

17. The extruder of claim 1 wherein the cross-sectional area of the interior of the barrel unoccupied by the substance of said screw is greater in the region of said vent than in regions of said first and second conveyor portions, said second conveyor portion having a conveying rate characteristic at least as great as said first conveyor portion, the increased volume available for plastic in the region of said vent adapted to accommodate transient variations in actual rate of movement of the plastic without blocking said vent.

18. The extruder of claim 17 wherein said vented space includes a region spaced more than one fourth inch from the main barrel surface and a vent line communicates with said vented space in said region.

19. The extruder as claimed in claim 17 wherein said screw comprises a longitudinally disposed root and a flight wherein the diameter of said root adjacent said vent is less than its diameter in the first and second conveyor portions of said extruder.

20. The extruder of claim 1 wherein said barrel is segmented, the portion of said barrel at said vent being separate from preceding and following sections of said barrel.

21. An extruder for extruding scrap plastic and the like comprising a hopper, a heated extruder barrel containing an extruder screw having a screw flight, a drive means for said screw, wherein said extruder has a feeder comprising initial portions of said barrel and screw, said initial screw portion having means for liquid cooling, the internal surface of said initial barrel portion having rotation retarding formations extending along the length thereof, said initial barrel portion having a forced feed fluid cooling system for cooling the surface of said retarding formations.

22. The extruder of claim 21 wherein said forced feed fluid cooling system is a liquid cooling system comprising a sleeve surrounding said initial portion of said barrel, said sleeve provided with apertures through which cooling liquid is supplied and removed.

23. The extruder as claimed in claim 21 wherein said rotation retarding formations comprise grooves, the major component of the length of said grooves being in the axial direction of said barrel.

24. The extruder of claim 23 wherein each of said grooves has the shape of a longitudinal section of a cylinder of a radius substantially less than that of said barrel.

25. The extruder as claimed in claim 24 wherein each of said grooves is circumferentially spaced from each of the remainder of said grooves by a cylindrical land surface centered on the axis of said barrel.

26. The extruder of claim 24 wherein the surface of said rotation retarding formations is smooth having a roughness measurement of no more than 20 RMS.

27. The extruder as claimed in claim 21 wherein a thermal barrier is provided between said initial barrel portion and the remainder of said barrel.

28. The extruder as claimed in claim 27 wherein said thermal barrier comprises a region of reduced thickness of the barrel wall.

29. An extruder for extruding scrap plastic and the like comprising a hopper, a vertically arranged extruding barrel extending downward from said hopper to an extruding die, an extruder screw extending throughout the length of said barrel, a drive means for said screw, said extruder having a feeder comprising initial portions of said barrel and screw both of which are provided with liquid cooling means, the internal surface of the cooled barrel defined by a plurality of axially extending retarding grooves.

30. The extruder of claim 29 wherein the upper end of said screw defines a bearing surface, an agitator shaft is coaxial with said screw and is rotatably positioned by said bearing surface, said agitator shaft extending upwardly through said hopper, said shaft carrying a hopper agitator, said means for driving said screw connected to the lower end thereof and drive means above said hopper connected to said agitator shaft.

31. A heated extruder including a screw having a shank extending beyond the extruder outlet, means for driving said screw, a seal defined with said shank for the molten plastic within said extruder, said seal comprising a plurality of portions each of which extends no more than 180° around the circumference of said shank, said portions being attached to each other to define an inner seal surface approximately congruent to the surface of said shank but radially floating with respect thereto, and means for anchoring said seal from rotation with said shank.

32. The extruder of claim 31 capable of extruding such plastics as polystyrene including, within the shank, a hollow thermal isolation volume disposed outwardly from the outlet point of said extruder, liquid cooling means for cooling shank portions located outwardly of said thermal isolation volume, said seal surrounding the shank at a portion containing said cooling means, said seal omitting liquid cooling.

33. The extruder of claim 31 wherein said means for anchoring comprises moment arm means constructed and arranged to restrain said seal for rotation without imposition of detrimental side loading.

34. The extruder of claim 33 wherein said moment arm means comprises moment arm of a length greater than four diameters of said shank.

35. A scrap recovery system for converting scrap plastic film and sheeting into reusable pellets, the system including a grinder adapted to produce fluff comprised of pieces of the original film or sheet and an extruder for receiving and melting said scrap pieces and extruding it as a fluid stream, said extruder comprising a hopper arranged to channel said scrap pieces downwardly, a vertically arranged extruder barrel containing an extruder screw having a screw flight extending throughout the length of said barrel and a drive means for said screw, said extruder having a scrap feeder comprising initial portions of said barrel and screw adapted to receive said scrap pieces from the hopper and feed a mass of the pieces downward within the confines of said barrel for subsequent compression, heating and discharge as a fluid stream, said initial screw portion being integral with portions of the screw downstream thereof and having internal passage means for liquid cooling, the internal surface of said initial barrel portion having rotation retarding means in the form of open grooves extending along the length thereof, said internal cooling liquid passage and said grooves having a mutual extent along the full length of said scrap feeder.

* * * * *